US007742368B2

(12) United States Patent
Lee et al.

(10) Patent No.: US 7,742,368 B2
(45) Date of Patent: Jun. 22, 2010

(54) NEAR FIELD LIGHT GENERATING DEVICE AND HEAT ASSISTED MAGNETIC RECORDING HEAD WITH THE SAME

(75) Inventors: Myung-bok Lee, Suwon-si (KR); Jin-seung Sohn, Seoul (KR); Sung-dong Suh, Seoul (KR); Hae-sung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 867 days.

(21) Appl. No.: 11/492,860

(22) Filed: Jul. 26, 2006

(65) Prior Publication Data
US 2007/0081426 A1 Apr. 12, 2007

(30) Foreign Application Priority Data
Oct. 12, 2005 (KR) .................. 10-2005-0096166

(51) Int. Cl.
*G11B 11/00* (2006.01)
(52) U.S. Cl. .............. 369/13.33; 369/112.01; 369/112.2; 369/112.21; 369/112.27; 369/112.28
(58) Field of Classification Search .......... 369/13.33, 369/112.01, 112.2, 112.21, 112.27, 112.28
See application file for complete search history.

(56) References Cited

U.S. PATENT DOCUMENTS

| | | | |
|---|---|---|---|
| 6,236,514 B1 * | 5/2001 | Sato | 359/664 |
| 6,270,696 B1 * | 8/2001 | Jain et al. | 264/1.1 |
| 6,359,850 B1 * | 3/2002 | Chung et al. | 369/112.01 |
| 6,594,430 B1 | 7/2003 | Rausch et al. | |
| 6,714,370 B2 * | 3/2004 | McDaniel et al. | 360/59 |
| 6,885,625 B2 * | 4/2005 | Lee et al. | 369/112.23 |
| 6,944,112 B2 * | 9/2005 | Challener | 369/112.27 |
| 7,227,643 B2 * | 6/2007 | Saeki, Tetsuo | 356/445 |

(Continued)

FOREIGN PATENT DOCUMENTS

JP 2000-221306 A 8/2000

(Continued)

OTHER PUBLICATIONS

Xiaolei Shi, "A Nano-aperture with 1000X Power Throughput Enhancement for Very Small Aperture Laser System (VSAL)", Proceedings of SPIE vol. 4342 (2002), pp. 320-327.*

*Primary Examiner*—Wayne R Young
*Assistant Examiner*—Brenda Bernardi
(74) *Attorney, Agent, or Firm*—Sughrue Mion, PLLC (57) ABSTRACT

A near field light generating device generating near field light from incident light by using a solid immersion mirror and a heat assisted magnetic recording head with the same are provided. The near field light generating device includes a light source; a waveguide core which transmits light; and a solid immersion mirror, which generates near field light, including an upper transmission surface through which light from the waveguide core is transmitted into the solid immersion mirror, a lower reflection surface, opposite the upper transmission surface, which reflections light incident thereon, lateral reflection surfaces, facing each other at sides of the solid immersion mirror, which reflect light incident thereon, and a lower transmission region disposed at a center of the lower reflection surface. Light reflected from the lateral reflection surfaces forms a light spot on the lower transmission region.

26 Claims, 10 Drawing Sheets

U.S. PATENT DOCUMENTS

| | | | |
|---|---|---|---|
| 7,362,693 B2* | 4/2008 | Lee et al. | 369/275.1 |
| 7,440,383 B2* | 10/2008 | Saito et al. | 369/112.24 |
| 7,440,384 B2* | 10/2008 | Eppler | 369/112.27 |
| 7,480,214 B2* | 1/2009 | Challener et al. | 369/13.24 |
| 2004/0001420 A1* | 1/2004 | Challener | 369/112.27 |
| 2004/0062503 A1* | 4/2004 | Challener | 385/129 |
| 2005/0078565 A1* | 4/2005 | Peng et al. | 369/13.32 |
| 2005/0213884 A1* | 9/2005 | Aldibi et al. | 385/43 |
| 2006/0182393 A1* | 8/2006 | Sendur et al. | 385/39 |
| 2006/0232869 A1* | 10/2006 | Itagi et al. | 360/59 |
| 2006/0256697 A1* | 11/2006 | Yamasaki et al. | 369/112.01 |
| 2007/0070824 A1* | 3/2007 | Nishida et al. | 369/13.02 |
| 2008/0304374 A1* | 12/2008 | Verschuren | 369/44.13 |
| 2009/0116804 A1* | 5/2009 | Peng et al. | 385/131 |

FOREIGN PATENT DOCUMENTS

JP    2001-509938 A    7/2001

* cited by examiner

NEAR FIELD LIGHT GENERATING DEVICE AND HEAT ASSISTED MAGNETIC RECORDING HEAD WITH THE SAME

CROSS-REFERENCE TO RELATED PATENT APPLICATION

This application claims the benefit of Korean Patent Application No. 10-2005-0096166, filed on Oct. 12, 2005, in the Korean Intellectual Property Office, the disclosure of which is incorporated herein in its entirety by reference.

BACKGROUND OF THE INVENTION

1. Field of the Invention

Apparatuses consistent with the present invention relate to a flat panel type near field light generating device which includes a flat panel type solid immersion mirror to generate near field light, and a heat assisted magnetic recording head with the same device.

2. Description of the Related Art

Research has been conducted to increase the recording density of magnetic recording media. As recording density increases, the bit size for recording unit information on a magnetic recording medium is reduced. However, as the bit size is reduced, the magnetic field signal from the magnetic recording medium becomes small. Thus, it becomes necessary to reduce noise in order to secure a good signal-to-noise ratio when reproducing data. As the noise is mainly generated from a magnetization transition region of the recording medium, the signal-to-noise ratio is secured by reducing the size of the grains forming the recording bits in order to reduce the transition noise.

To stably maintain the information recorded in a magnetic recording medium, each spinning grain should maintain its recorded orientation without heat fluctuation. For this purpose, the ratio of magnetic anisotropy energy to heat energy ($K_U V/K_B T$) should have a sufficiently large value (about 60 or more), where, $K_U$ is the magnetic anisotropy energy density of the magnetic recording medium, V is the grain volume size, $K_B$ is the Boltzmann constant, and T is the absolute temperature. To secure the thermal stability of a high-density recording medium having a small grain, the magnetic anisotropy energy density of the magnetic recording medium should increase at a constant temperature. The magnetic anisotropy energy density is proportional to the coersive force materials, therefore a large coersive force should be used for the magnetic recording medium.

However, when these materials are used to increase the thermal stability of the magnetic recording medium, data recording is impossible due to the strength limit of the magnetic field generated in a magnetic recording head.

To address the aforementioned problem, a heat assisted magnetic recording system has been developed. According to this system, heat is locally applied to the magnetic recording medium to lower the coersive force so that the magnetic recording medium can be easily magnetized by the magnetic field applied from the magnetic recording head. Although the grain size of the recording medium decreases when the heat assisted magnetic recording head is used, the thermal stability is secured.

A method of irradiating laser beam is generally used to apply heat locally to a magnetic recording medium.

Figure 1:
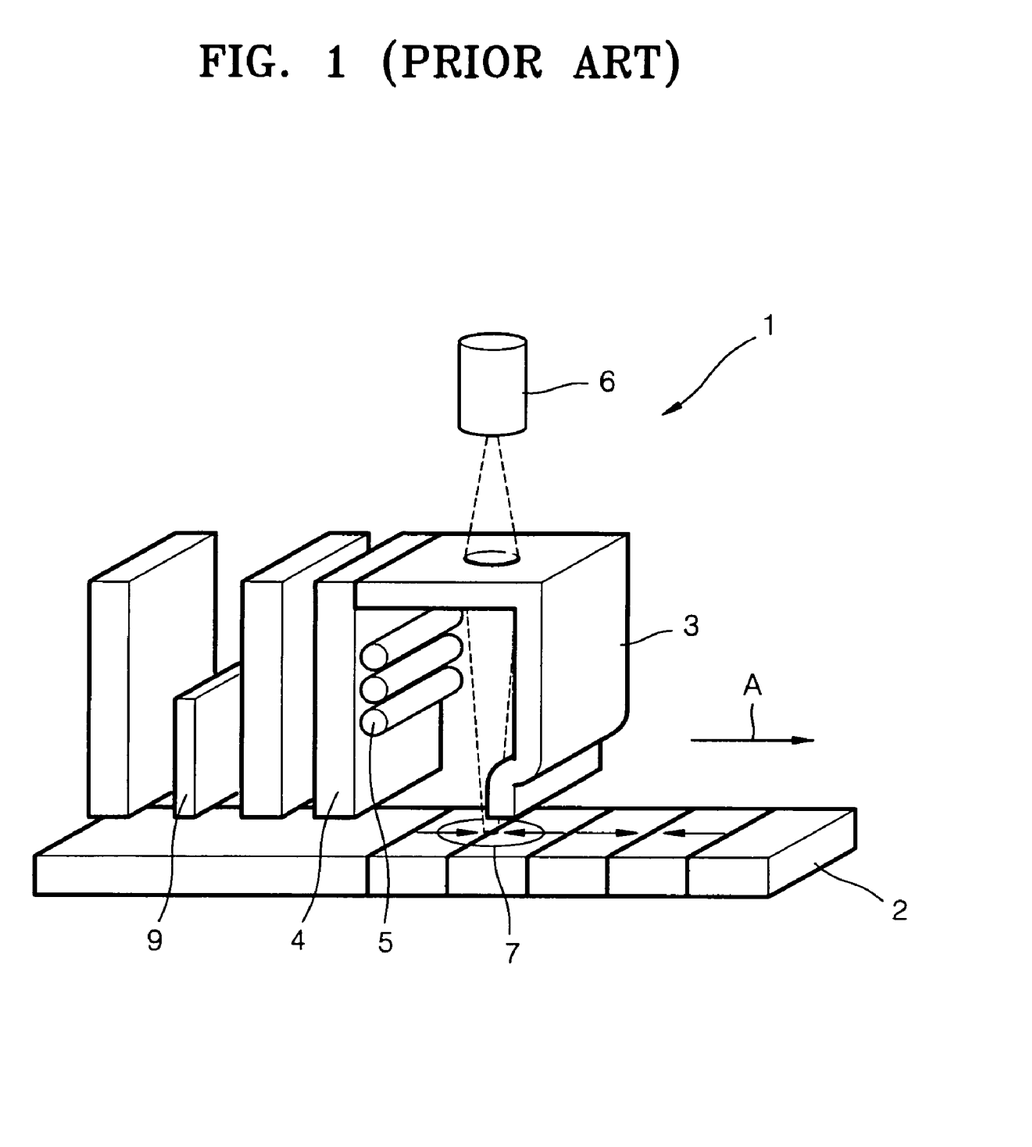
FIG. 1 is a schematic perspective view of a conventional heat assisted magnetic recording head.

FIG. 1 is a schematic perspective view of a conventional heat assisted magnetic recording head 1, which comprises a recording unit for converting information into a magnetic signal and applying the magnetic signal to a magnetic recording medium 2, a reproducing unit including a reproduction element 9 for detecting a bit recorded on the magnetic recording medium 2, and an optical system including a light source 6, such as a laser diode, for heat assistance. The recording unit includes a recording pole 3, for applying a magnetic field to the magnetic recording medium 2; a return pole 4 for forming a magnetic circuit together with the recording pole 3; and an induction coil 5 for inducing a magnetic field in the recording pole 3. When the magnetic recording medium 2 moves in direction A, a light spot 7 is formed on the magnetic recording medium 2 by the laser beam generated from the light source 6, and when the coersive force is lowered immediately after the magnetic recording medium 2 is heated by the laser beam, the magnetic recording medium 2 is magnetized by magnetic flux leakage generated from the recording pole 3. The information recorded in this manner is reproduced by the reproduction element 9, which may be a giant magnetoresistance element.

To enable the high-density recording by the heat assisted magnetic recording head 1, the light spot formed by the laser beam has to be very small. For example, a light spot having a diameter of about 50 nm is required in order to obtain a recording density of 1 Tb/in$^2$. There have been research conducted on a heat assisted magnetic recording method to obtain a small light spot by using near field light. Such research generally utilizes near field light having an aperture of the size same as or less than half the wavelength of light. However, in such a near field light head, the transmission efficiency of light is very low and it is difficult to form the aperture into the magnetic head.

U.S. Pat. No. 6,594,430 discloses a heat assisted magnetic recording head using a SIL (solid immersion lens) in the form a mode index waveguide lens, which is a two-dimensional optical element. In this patent, however, since the optical element includes a number of refraction surfaces, it is difficult to control scattering and mode conversion of a progressive wave generated at the interface between the waveguide core and the lens, it is difficult to form a large number of apertures, aberration generated due to a beam misaligned with respect to an optical axis is large, and the focal length remarkably changes according to a change of the thickness of the thin film.

SUMMARY OF THE INVENTION

Apparatuses consistent with the present invention provide a near field light generating device and a heat assisted magnetic recording head comprising the same, wherein the near field light generating device is a flat panel type which has high light transmission efficiency and a small light spot and can be easily integrated into a magnetic recording head.

According to an exemplary aspect of the present invention, there is provided a near field light generating device comprising: a light source; a waveguide core which transmits light; and a solid immersion mirror which generates near field light using the light transmitted through the waveguide core. The solid immersion mirror comprises an upper transmission surface through which light from the waveguide core is transmitted into the solid immersion mirror; a lower reflection surface, opposite the upper transmission surface, which reflects light incident thereon; lateral reflection surfaces, facing each other at sides of the solid immersion mirror, which reflect light incident thereon; and a lower transmission region disposed at a center of the lower reflection surface. Light reflected from the lateral reflection surfaces forms a light spot on the lower transmission region.

According to another exemplary aspect of the present invention, there is provided a heat assisted magnetic recording head which improves recording density by locally irradiating light onto a magnetic recording medium and which comprises a recording pole which generates magnetic flux leakage for magnetic recording; and a near field light generating device, arranged adjacent to the recording pole, which irradiates light before a magnetic field is applied to the magnetic recording medium. The near field light generating device comprises a light source; a waveguide core which transmits light; and a solid immersion mirror which generates near field light by using the light transmitted in the waveguide core. The solid immersion mirror comprises an upper transmission surface through which light from the waveguide core is transmitted into the solid immersion mirror; a lower reflection surface, opposite the upper transmission surface, which reflects light incident thereon; lateral reflection surfaces, facing each other at sides of the solid immersion mirror, which reflect light incident thereon; and a lower transmission region disposed at a center of the lower reflection surface. Light reflected from the lateral reflection surfaces forms a light spot on the lower transmission region.

BRIEF DESCRIPTION OF THE DRAWINGS

The above and other features and advantages of the present invention will become more apparent based on the following detailed description of exemplary embodiments of the present invention with reference to the attached drawings in which.

DETAILED DESCRIPTION OF EXEMPLARY EMBODIMENTS OF THE INVENTION

A near field light generating device and a heat assisted magnetic recording head with the same according to exemplary embodiments of the present invention will now be described more fully hereinafter with reference to the accompanying drawings.

Figure 2A:
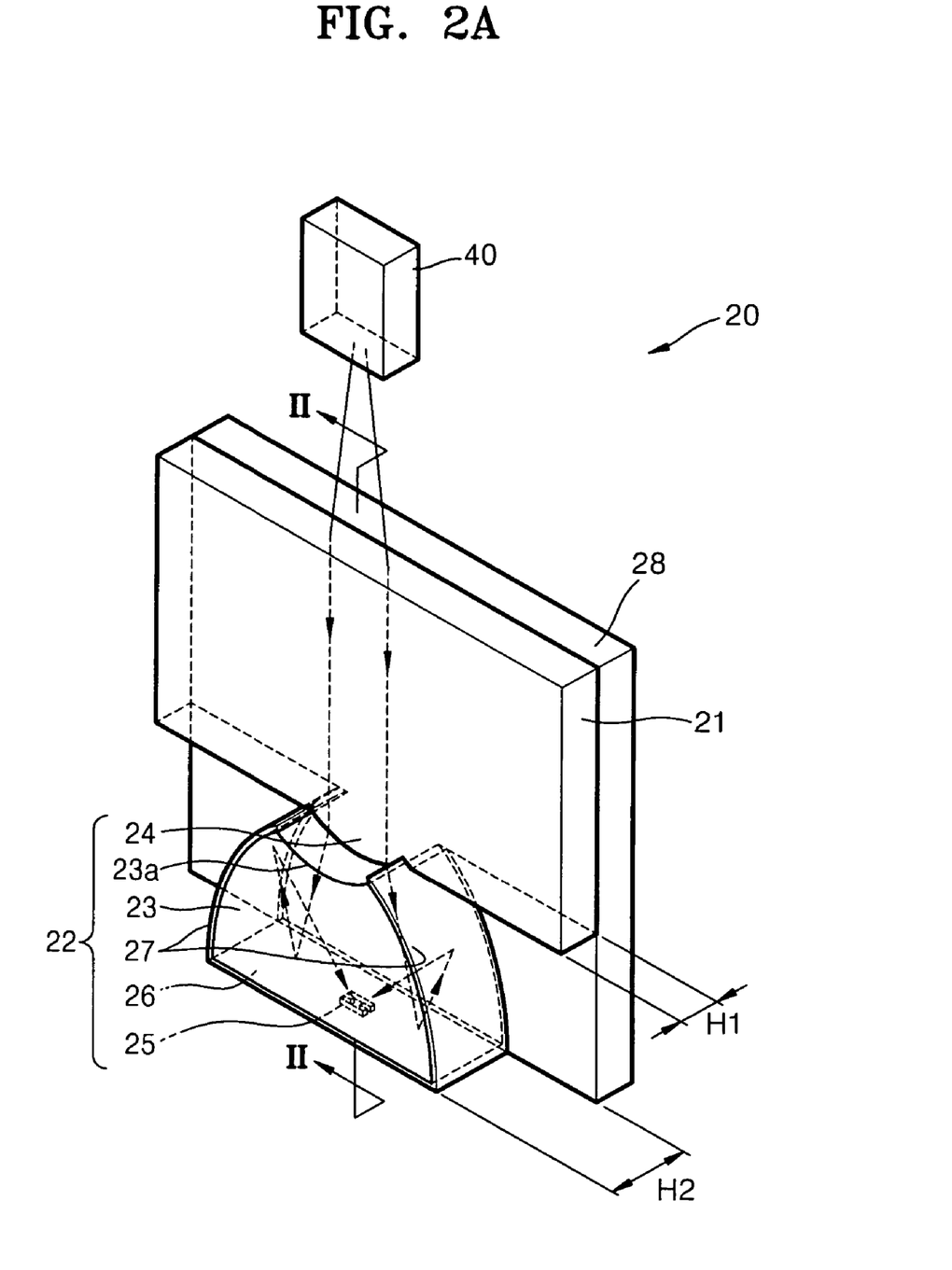
FIG. 2A is a schematic perspective view of a near field light generating device according to an exemplary embodiment of the present invention.
Figure 2B:
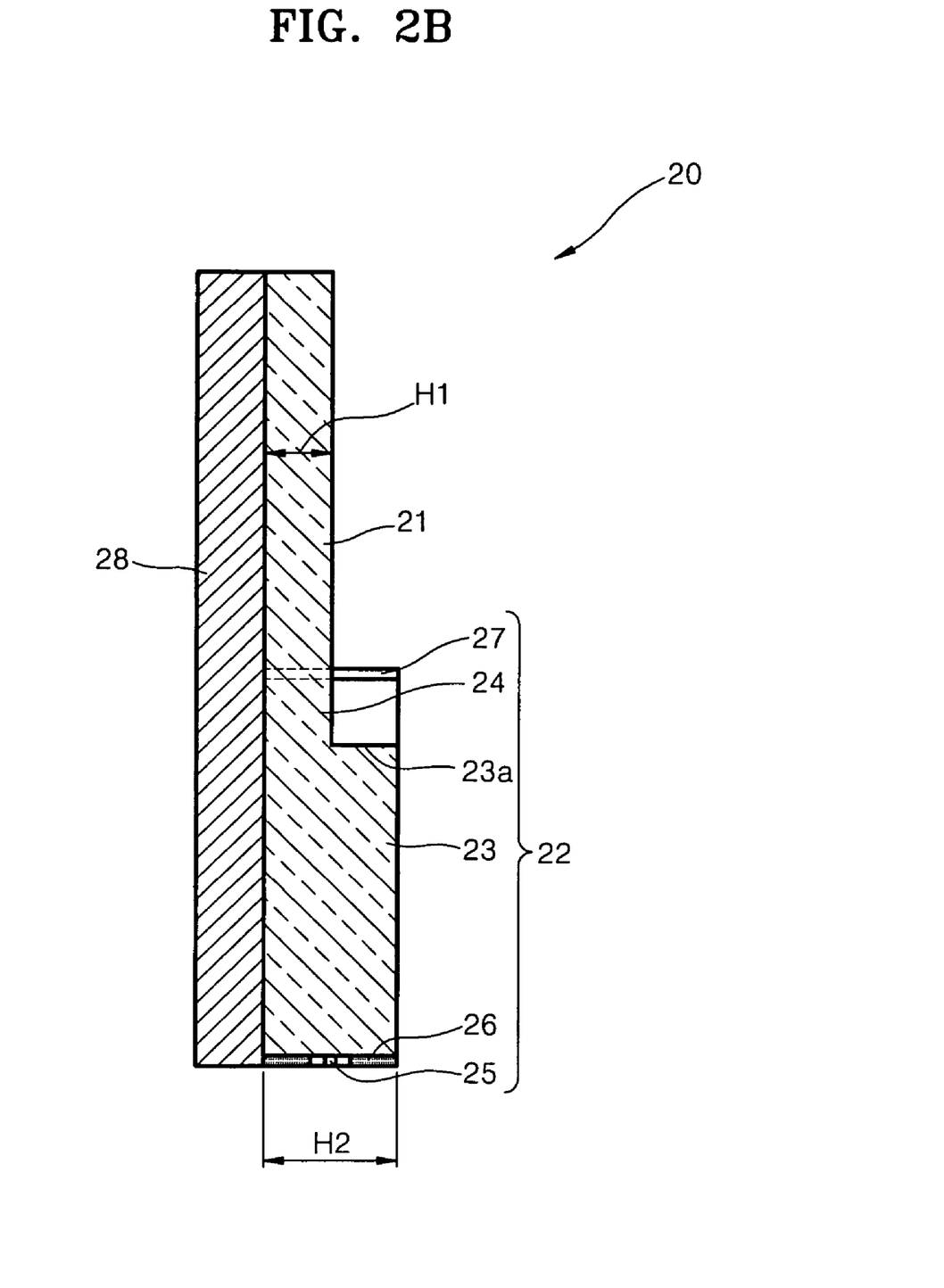
FIG. 2B is a sectional view taken along line II-II of FIG. 2A.

FIG. 2A is a schematic perspective view of a near field light generating device 20 according to an exemplary embodiment of the present invention, and FIG. 2B is a sectional view taken along line II-II of FIG. 2A.

The near field light generating device 20 comprises a first clad layer 28, a waveguide core 21, a solid immersion mirror 22 formed on the first clad layer 28, and a light source 40. Further, a second clad layer 29 (see FIG. 7) may be layered on the waveguide core 21 and the solid immersion mirror 22.

The light source 40 is connected to one side of the waveguide core 21 and emits light to the waveguide core 21. The light source 40 may be, for example, a laser diode. In this case, the light source 40 may abut the waveguide core 21. That is, a light emission region of the laser diode may directly contact one side of the waveguide core 21. Thereby, the structure of the near field light generating device 20 may be simplified without the need for any additional optical parts between the light source 40 and the waveguide core 21.

The waveguide core 21, which is a transparent member of a flat panel type, transmits incident light to the solid immersion mirror 22. The waveguide core 21 transmits the light via total internal reflection, and the refractive indexes of the materials of the first and second clad layers 28 and 29 should be less than the refractive index of the waveguide core 21. For example, any one of $SiO_2$, $CaF_2$, $MgF_2$ and $Al_2O_3$ may be used for the first and second clad layers, and any one of SiN, $Si_3N_4$, $TiO_2$, $ZrO_2$, $HfO_2$, $Ta_2O_5$, $SrTiO_3$, GaP and Si may be used for the waveguide core. When GaP or Si is used as the material of the waveguide core, the incident light may be near infrared light rather than visible light having a high absorption ratio. In the exemplary embodiment of FIG. 2A, the second clad layer is illustrated as an air layer having a refractive index of 1.

The solid immersion mirror 22 has a flat panel type body 23, an upper transmission surface 24, a lower transmission region 25, and lateral reflection surfaces 26 and 27, which.

The light transmitted from the waveguide core 21 is incident on the solid immersion mirror 22 and is transmitted through the upper transmission surface 24.

The effective refractive index of the solid immersion mirror 22 may be greater than that of the waveguide core 21. The effective refractive index is defined as a ratio of the speed of light in a free space to the speed of light progressing within the waveguide.

When light is transmitted through the waveguide, the light spreads in a specific mode, and the effective refractive index of the light progressing along the waveguide varies according to the mode. The mode acceptable in the waveguide also varies according to the shape of the waveguide. The effective refractive index of the flat panel type waveguide varies according to the thickness of the waveguide.

Figure 3A:
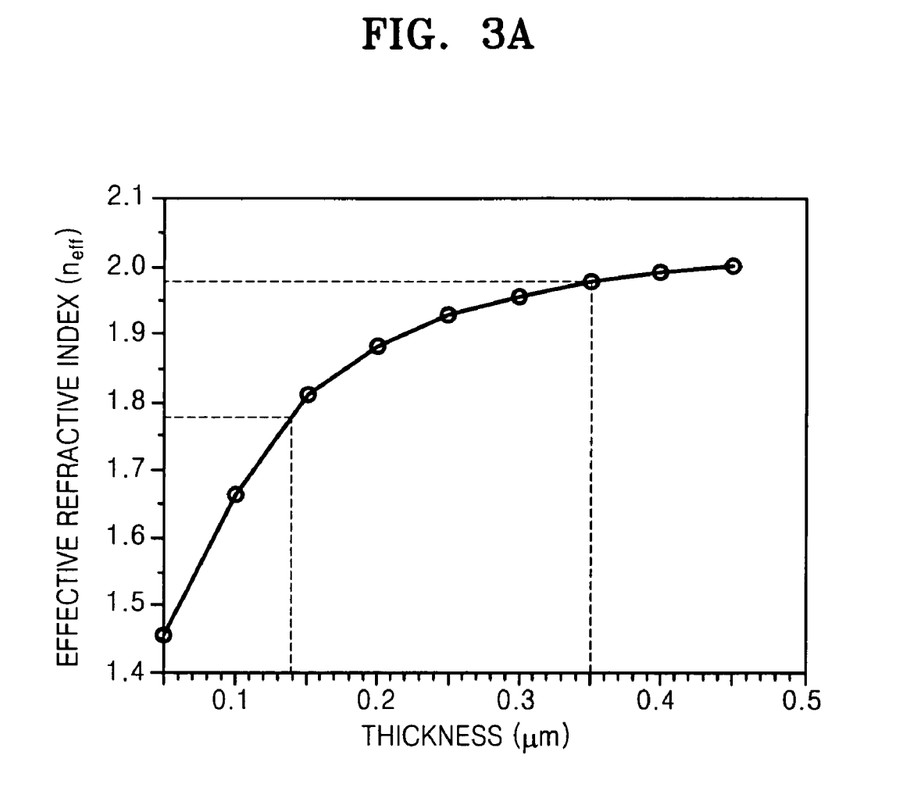
FIG. 3A illustrates a change of an effective refractive index according to the thickness of a waveguide core.
Figure 3B:
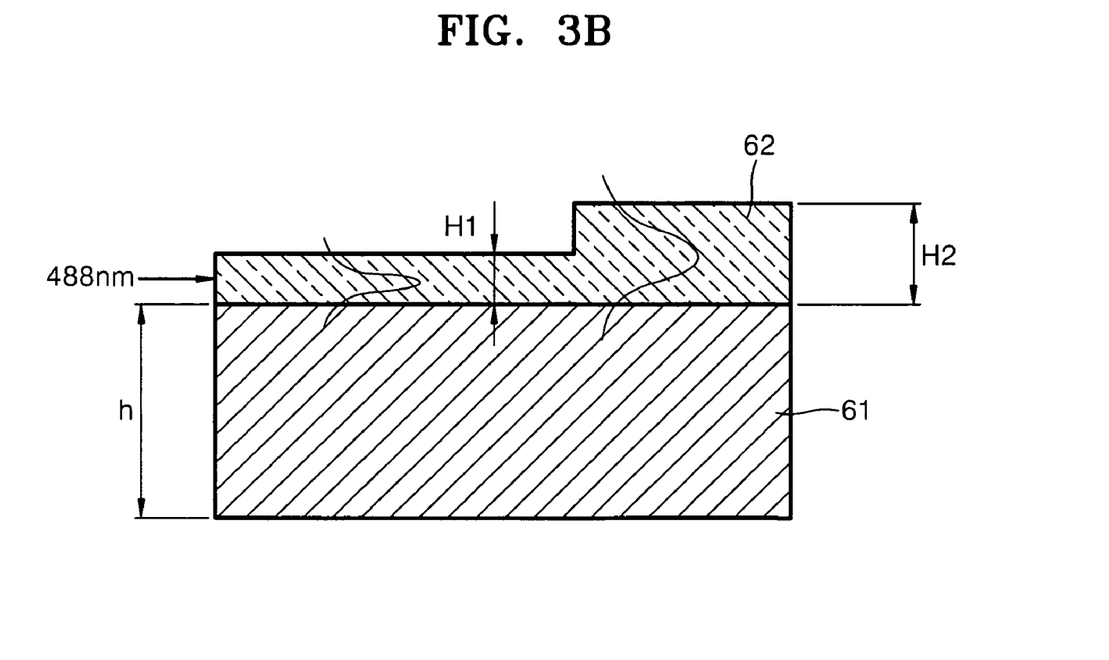
FIG. 3B illustrates a structure of a waveguide used in the simulation of FIG. 3A.

The above can be confirmed from the simulation results shown in FIGS. 3A and 3B. FIG. 3A is a graph in which the effective refractive index $n_{eff}$ is calculated according to the thickness of a core 62 in a standard mode when a laser beam having a wavelength of 488 nm is incident on the waveguide as illustrated in FIG. 3B. The waveguide includes a first clad layer 61 (a flat panel type) and a core 62 (a flat panel type), and the core 61 is layered on the first clad layer 61, with a different thickness. The part of the core 62 having a thin thickness H1 corresponds to the waveguide core 21 (see FIG. 2B) in the embodiment of FIG. 2A, and the part of the core 62 having a thickness H2 corresponds to the solid immersion mirror 22 (see FIG. 2B) in the embodiment of FIG. 2A.

According to the simulation results, the first clad layer 61 can be made of $SiO_2$ having a refractive index of 1.413 and a thickness h of 1000 nm. The core 62 can be made of $Si_3N_4$ having a refractive index of 2.041 and a thickness within the range of 50 nm to 450 nm.

In FIG. 3A, as the thickness of the core 62 is larger, the effective refractive index becomes larger. For example, when the thickness of the core 62 is 140 nm, the effective refractive index is 1.793, and when the thickness is 350 nm, the effective refractive index is 1.977.

The near field light generating device of FIG. 2A uses the change of the effective refractive index according to the thickness of the waveguide core, as described above. The solid immersion mirror 22 is made of the same material as the waveguide core 21, and is integrally formed with the waveguide core 21 so that the waveguide core 21 and the solid immersion mirror 22 are not physically separated from each other. The thickness H2 of the solid immersion mirror 22 is greater that the thickness H1 of the waveguide core 21, so that the effective refractive index of the solid immersion mirror 22 is greater than the effective refractive index of the waveguide core 21. After the solid immersion mirror 22 is integrally layered on the waveguide core 21 using a typical thin film process, the thickness can be changed by an etching process.

The waveguide core 21 and the solid immersion mirror 22 are optically different from each other due to the difference between their effective refractive indexes, and the upper transmission surface 24 forms an optical boundary surface between the waveguide core 21 and the solid immersion mirror 22.

The upper side 23a of the upper transmission surface is a spherical surface having negative refractive power. With respect to the waveguide, the solid immersion mirror 22 acts as a mode index lens due to the difference between the effective refractive index of the waveguide core 21 and the effective refractive index of the solid immersion mirror 22, and the light transmitted to the upper transmission surface 24 is refracted and diverged due to the spherical surface having negative refractive power.

The lower reflection surface 26 is disposed opposite to the upper transmission surface 24, and is perpendicular to the first clad layer 28 where the solid immersion mirror 22 is positioned.

The lower transmission region 25 is arranged in the center of the lower reflection surface 26.

Figure 7:
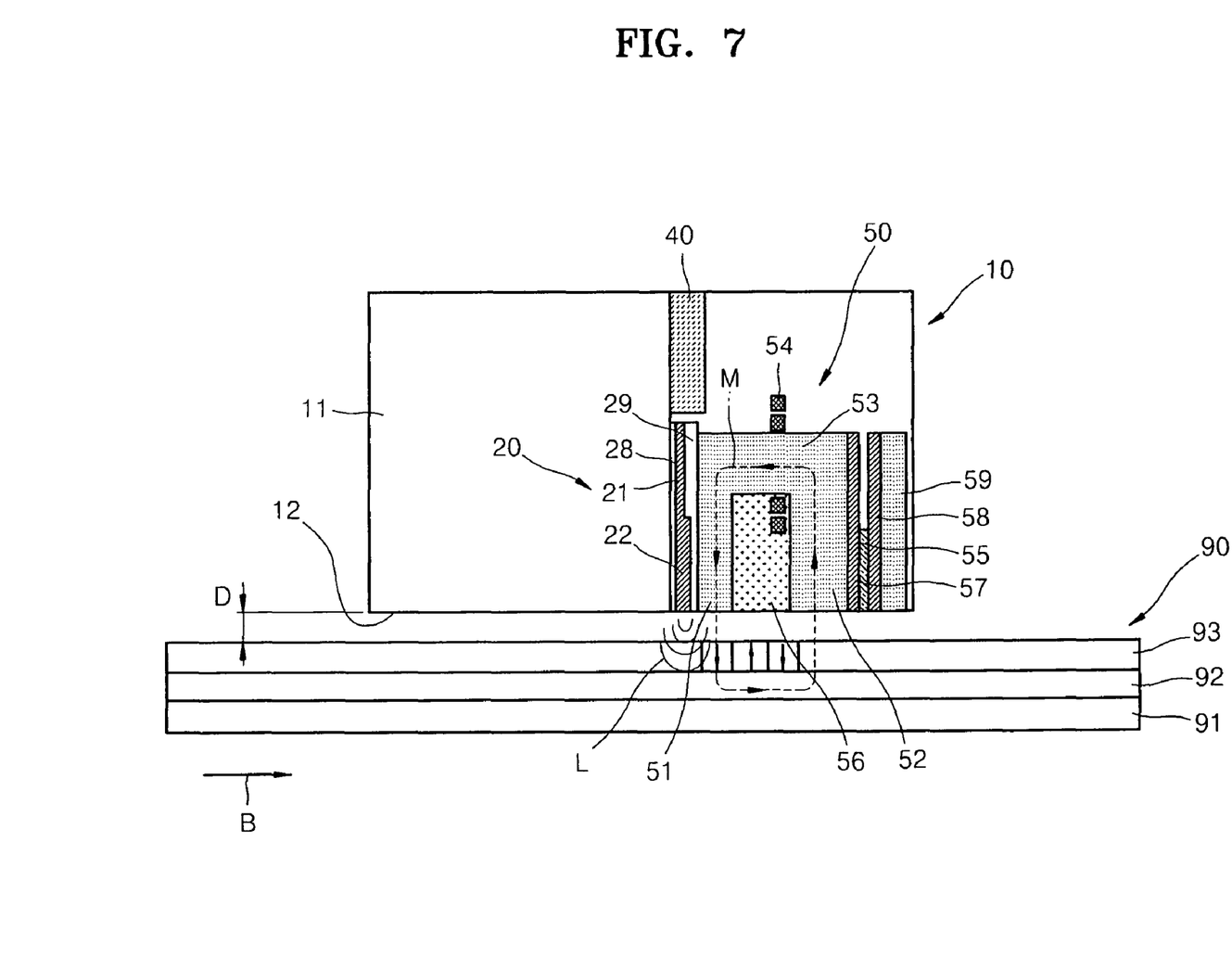
FIG. 7 is a schematic sectional view of a heat assisted magnetic recording head with the near field light generating device of FIG. 2A, according to an exemplary embodiment of the present invention.

The lower reflection surface 26 and the lower transmission region 25 form a part of an air bearing surface 12 (see FIG. 7) and face a magnetic recording medium 90 (see FIG. 7). The lower reflection surface 26 reflects the light refracted from the upper transmission surface 24.

The lateral reflection surfaces 27 are arranged at the sides of the solid immersion mirror 22 and have aspheric surfaces perpendicular to the first clad layer 28 where the solid immersion mirror 22 is positioned. The lower reflection surface 26 and the lateral reflection surfaces and 27 have a metal thin film formed thereon. The metal thin film may be thicker than a skin depth in order to reflect light, where a skin depth is a penetration distance of an electromagnetic wave into a medium, in this case, the metal thin film. Generally a skin depth is defined by the distance at which the flux density of the electromagnetic wave decreases by a factor of 1/e (i.e. by 37%). Accordingly, the metal thin film may be thicker than a skin depth in order to prevent light leakage.

The lateral reflection surfaces 27 re-reflect the light reflected by the lower reflection surface 26 and forms a light spot on the lower transmission region 25.

The size of the light spot is proportional to the wavelength of the light, which is generally concentrated, and it is inversely proportional to the number of apertures of the optical member which concentrates the light. Therefore, the solid immersion mirror 22 may have a large number of apertures. Thus, materials having large refractive indexes can be selected for the solid immersion mirror 22. In addition, the number of apertures of the solid immersion mirror 22 can be increased by enlarging the angle between an optical axis and a beam of light having a maximum tilt angle, of the light which is re-reflected to the lower transmission region 25 and forms the light spot. Accordingly, it is possible to reduce the size of the light spot.

The lower transmission region 25 is a through hole formed in the metal thin film on the lower reflection surface 26. To generate near field light having a smaller beam size, the diameter of the through hole can be the same as or smaller than the wavelength of the incident light. In this case, to increase light transmission efficiency, the lower transmission region 25 may comprise through holes 25a and 25a', and at least one or more protrusions 25b and 25b', as exemplified in FIGS. 4A and 4B, may extend thereinto. The protrusions 25b and 25b' are formed of a part of the metal thin film which protrudes toward the center of the through holes. The through holes 25a and 25a' have a substantially rectangular shape, as shown in FIGS. 4A and 4B, but may have a polygonal or round shape.

Figure 4A:
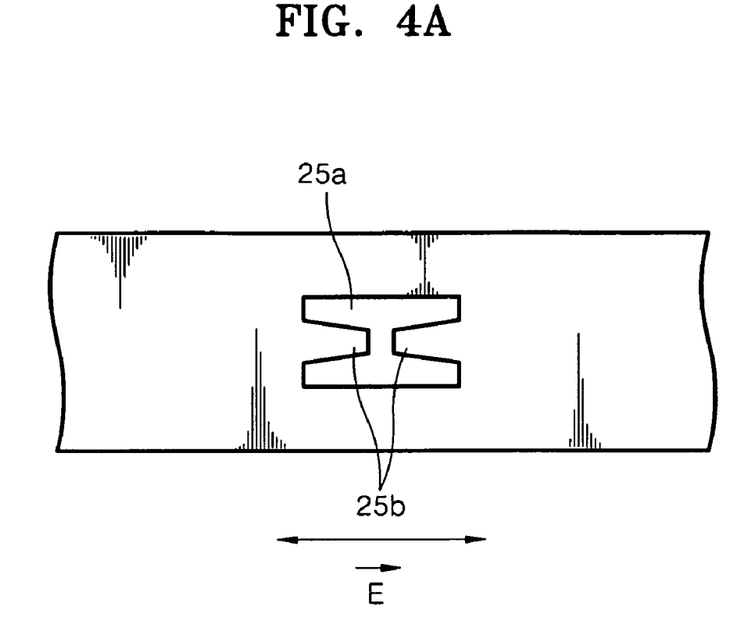
FIGS. 4A and 4B illustrate a lower transmission region of the near field light generating device of FIG. 2A, according to an exemplary embodiment of the present invention.
Figure 4B:
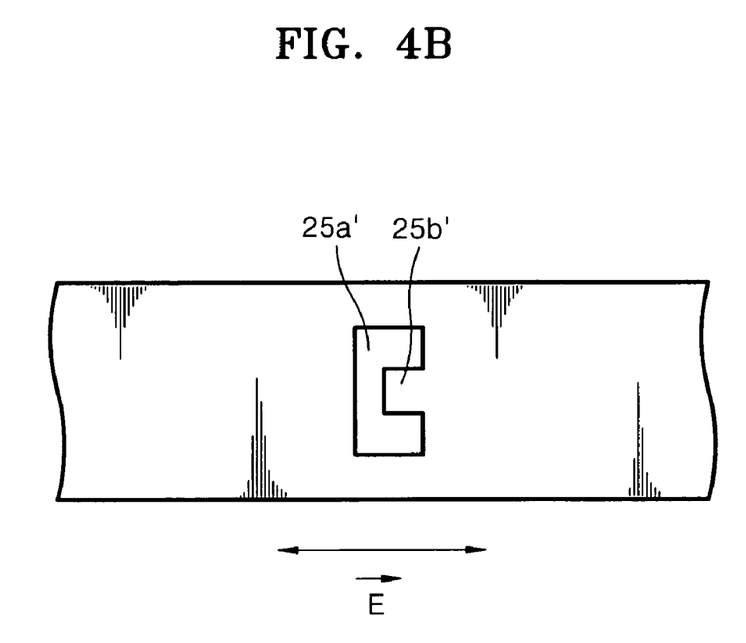

With reference to FIG. 4A, the lower transmission region 25 has a bow-tie antenna structure in which two protrusions 25b protrude in the longitudinal direction E from the lower reflection surface 26, and the interval between the two protrusions 25b is a few nm to 100 nm. When the light in a TE (transverse electric) mode, in which the vibration direction of an electric field is the direction E, passes through the lower transmission region 25, an electric dipole vibrates by the electric field induced at both ends of the protrusions 25b, and the intensity of the light in the TE mode is strengthened.

As described above, when the light, which is re-reflected at the lateral reflection surfaces 27 and forms the light spot in the lower transmission region 25, passes through the lower transmission region 25, the beam size of the concentrated light becomes smaller and the light intensity is strengthened, thereby making it easy to use the near field light.

Further, to increase the strength of the intensity of the near field light, it is possible to use the surface plasmon excitation phenomenon by selecting a metal of high conductivity as the material of the metal thin film forming the lower reflection surface 26. That is, as the surface plasmon excitation is generated at the metal thin film around the apertures 25a and the metal thin film forming the protrusions 25b by the light spot formed on the lower transmission region 25, the intensity of the transmitted light can be strengthened more. For this purpose, the material for the metal thin film may be any one of Au, Ag, Pt, Cu, and Al.

The near field light generating device 20 as described above can minimize optical aberration (specifically, chromatic aberration) by using a flat panel type solid immersion mirror 22, which is a mirror optic system in which the refraction surface exists in the upper transmission surface 24 only, compared to a conventional near field light generating device using a solid immersion lens. Further, as the upper transmission surface 24 has only one refraction surface where scattering can be generated by a mode conversion within the near field light generating device 20, there is almost no light loss except for the coupling loss from the light source 40 to the waveguide core 21. Therefore, it is possible to increase the light efficiency of the near field light generating device 20. Furthermore, as the flat panel type solid immersion mirror 22 has a great permissible misalignment degree of the incident beam with respect to the optical axis, the near field light generating device 20 does not have to include a separate collimator lens, so that it is possible to reduce the number of optical parts.

Figure 5A:
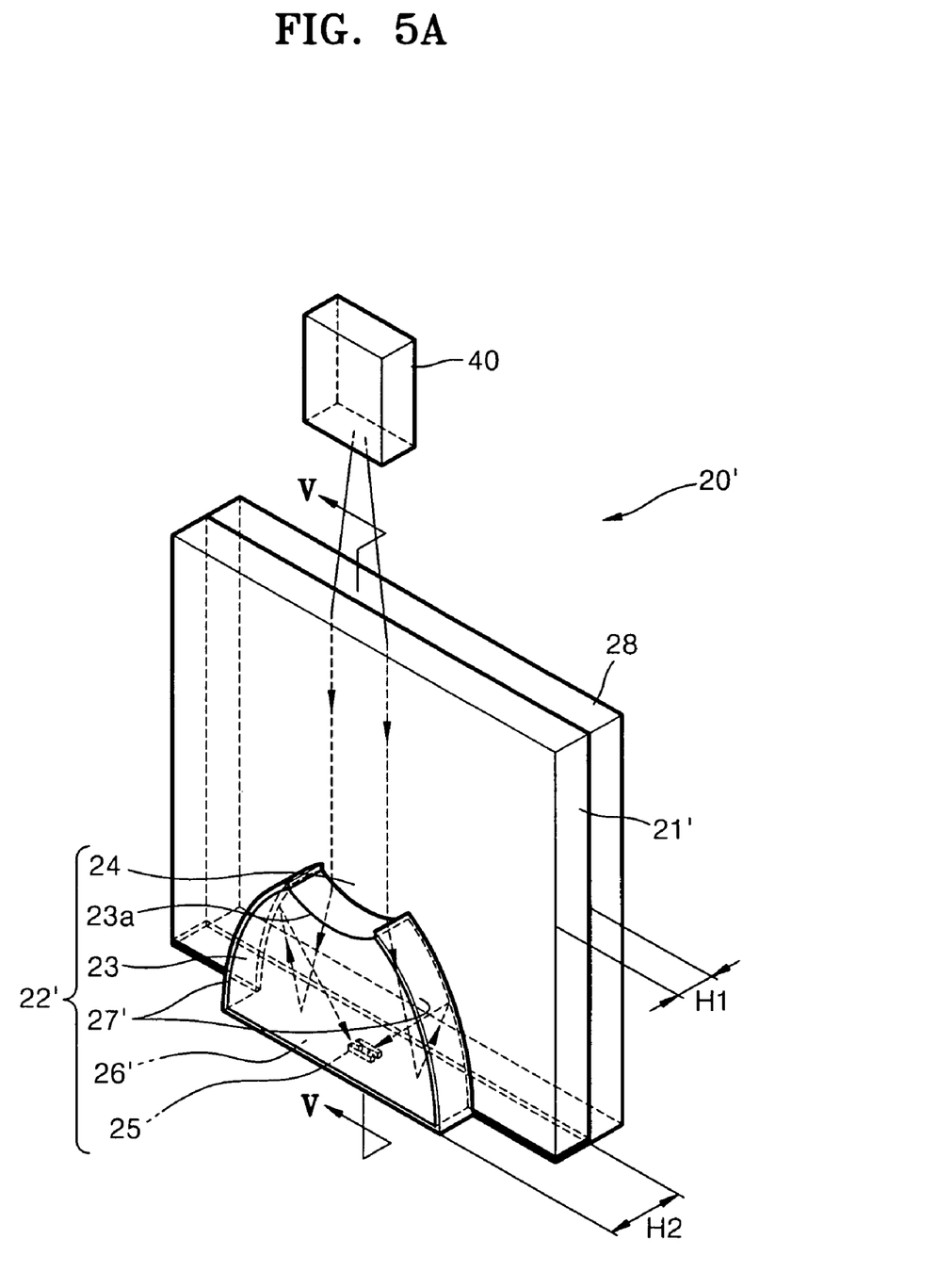
FIG. 5A is a schematic perspective view of a near field light generating device according to another exemplary embodiment of the present invention.
Figure 5B:
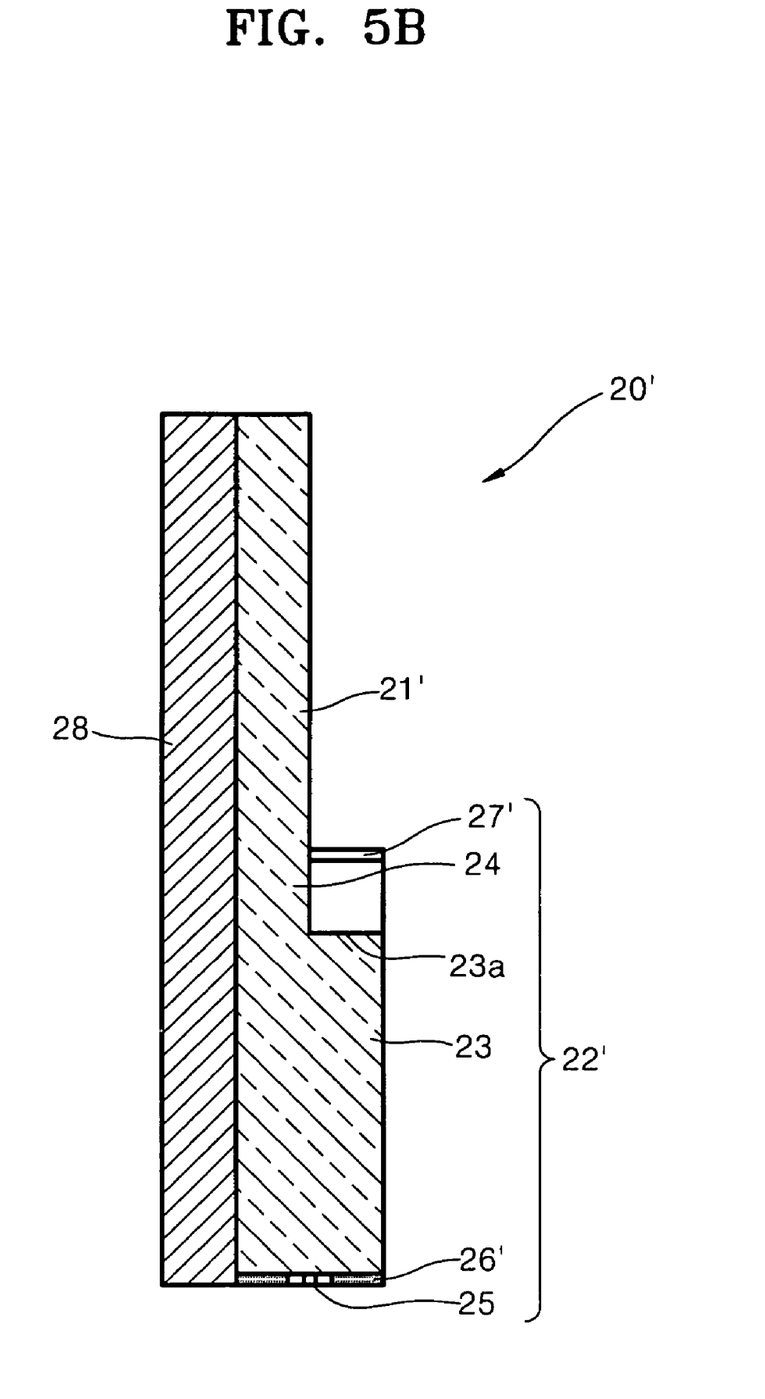
FIG. 5B is a sectional view taken along line V-V of FIG. 5A.

FIG. 5A is a schematic perspective view of a near field light generating device 20' according to another exemplary embodiment of the present invention, and FIG. 5B is a sectional view taken along line V-V of FIG. 5A.

The main constitution and operation of the near field light generating device 20' according to the exemplary embodiment of FIG. 5A will not be presented in detail since they are same as those of the near field light generating device according to the exemplary embodiment of FIG. 2A. Below will be described the differences between the near field light generating device 20' of FIG. 5A and the near field light generating device of the embodiment of FIG. 2A.

Referring to the embodiment of FIG. 2A, the side of the solid immersion mirror 22 and the waveguide core 21 are separated from each other, except at the upper transmission region 24. However, in the embodiment of FIG. 5A, the part adjacent to the outline of the solid immersion mirror 22' of the waveguide core 21 is not removed. Thus, in the embodiment of FIG. 5A, the lateral reflection surfaces 27' are formed at the solid immersion mirror where it protrudes laterally from the waveguide core 21. The lower surface of the waveguide core 21' forms a part of the air bearing surface 12 (see FIG. 7), and the metal thin film formed on the lower reflection surface 26' is extended over the lower surface of the waveguide core 21'.

Figure 6A:
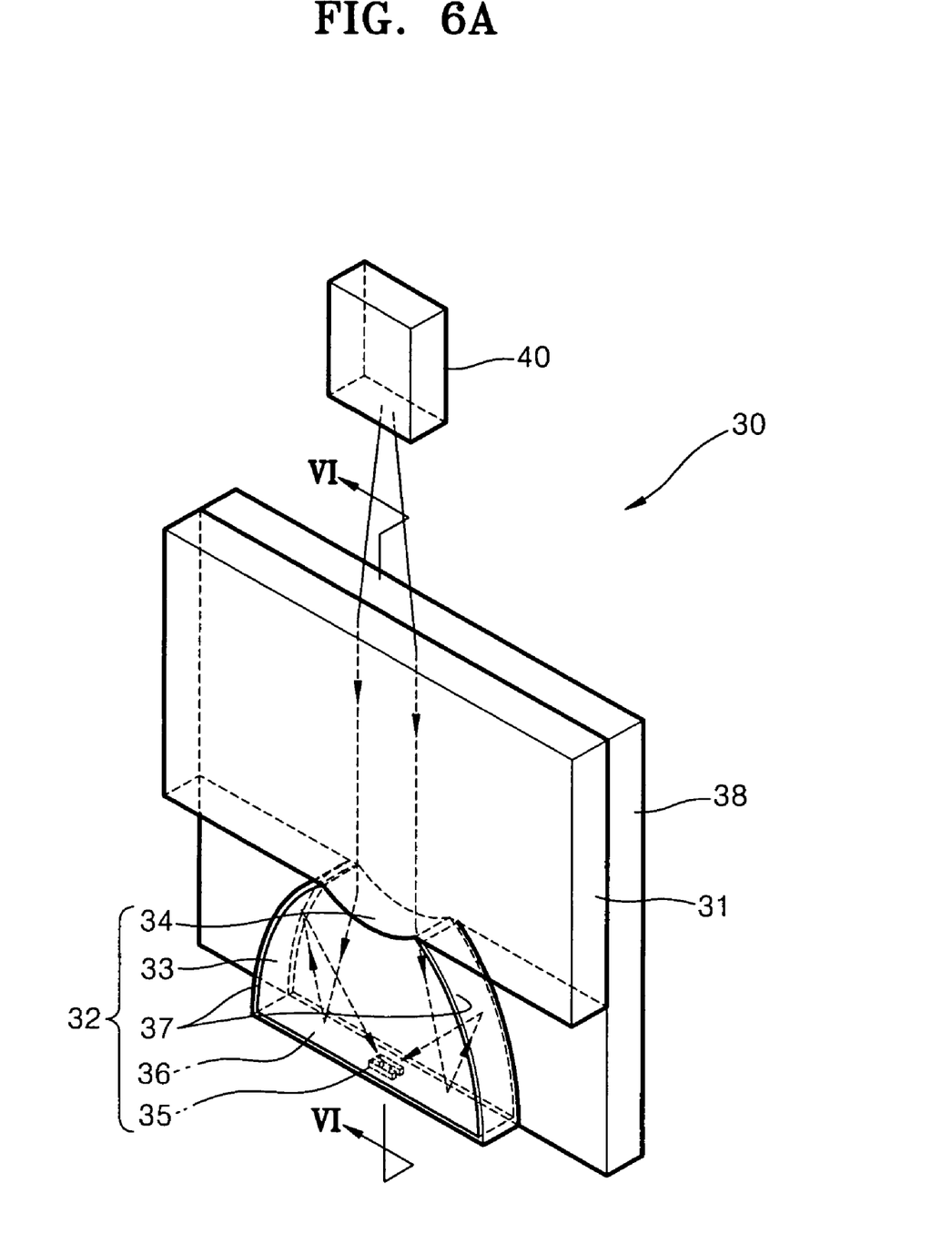
FIG. 6A is a schematic perspective view of a near field light generating device according to another exemplary embodiment of the present invention.
Figure 6B:
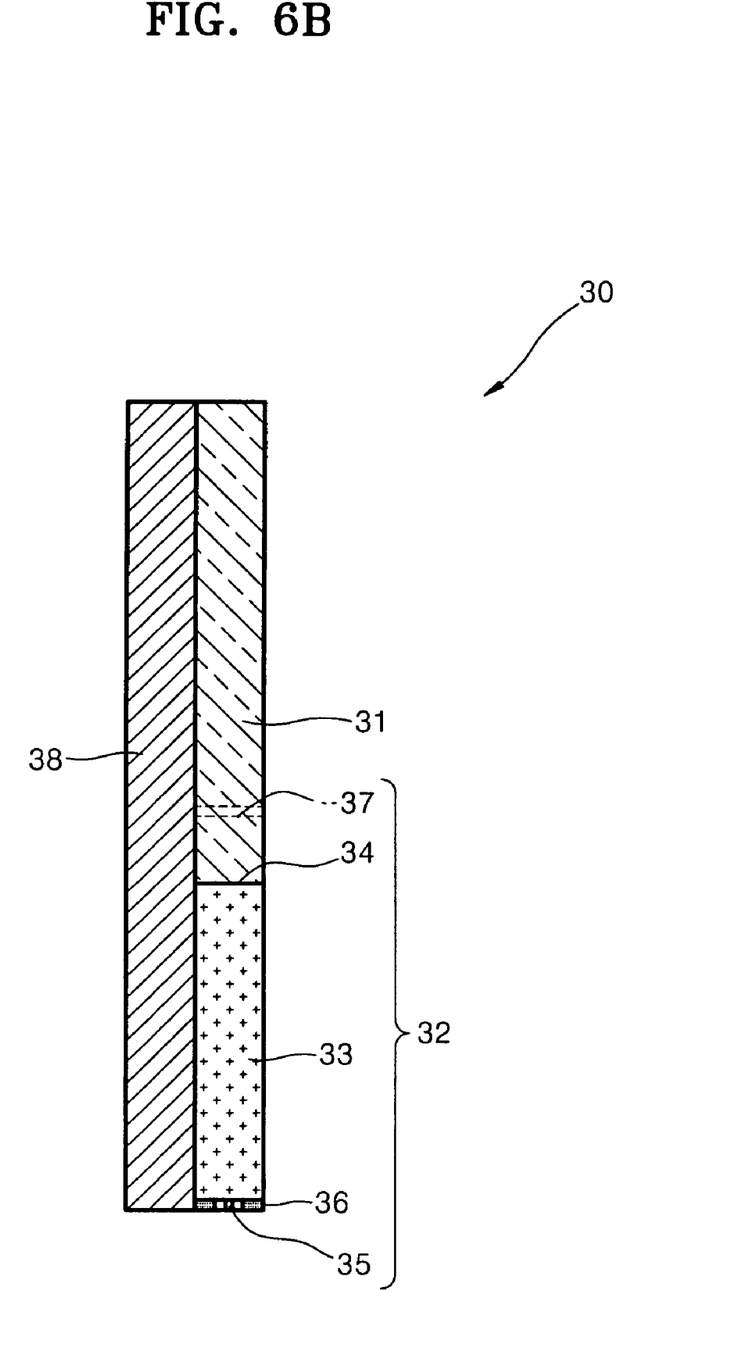
FIG. 6B is a sectional view taken along line VI-VI of FIG. 6A.

FIG. 6A is a schematic perspective view of a near field light generating device 30 according to another exemplary embodiment of the present invention, and FIG. 6B is a sectional view taken along line VI-VI of FIG. 6A.

The main constitution and operation of the near field light generating device 30 according to the exemplary embodiment of FIG. 6A will not be presented in detail since they are same as those of the near field light generating devices according to the exemplary embodiments of FIGS. 2A and 5A. Below will be described the differences between the near field light generating device 30 of FIG. 6A and the near field light generating devices of the exemplary embodiments of FIGS. 2A and 5A.

With reference to FIG. 6A, the near field light generating device 30 comprises a first clad layer 38, a flat panel type waveguide core 31 and a solid immersion mirror 32, and a light source 40. The waveguide core and the solid immersion mirror are layered on the first clad layer 38.

The solid immersion mirror 32 is in contact with the lower side of the waveguide core 31 and includes a flat panel type body 33 having an upper transmission surface 34, a lower transmission region 35, a lower reflection surface 36, and lateral reflection surfaces 37.

In contrast to the embodiment of FIG. 5A, in the embodiment of FIG. 6A, the thickness of the solid immersion mirror 32 is the same as the thickness of the waveguide core 31, but the refractive index of the material forming the solid immersion mirror is greater than that of the material forming the waveguide core 31. Further, the upper transmission surface 34, as the boundary surface between the solid immersion mirror and the waveguide core 31, is a curved convex surface bent convexly toward the lower reflection surface 36; that is, the upper transmission surface 34 has negative refractive power. Thus, the solid immersion mirror 32 acts as a mode index lens with respect to the waveguide.

The light transmitted in the waveguide core 31 is incident on the solid immersion mirror via the upper transmission surface 34. The light refracted from the upper transmission surface 34 is radiated toward the lower reflection surface 36.

Next, a heat assisted magnetic recording head with the near field light generating device according to exemplary embodiments of the present invention will be described in detail.

FIG. 7 is a schematic sectional view of a heat assisted magnetic recording head 10 according to an exemplary embodiment of the present invention.

With reference to FIG. 7, the heat assisted magnetic recording head 10 comprises a substrate 11, a near field light generating device 20 positioned at one side of the substrate 11, and a recording unit 50, positioned adjacently to the near field light generating device 20. The recording unit 50 includes a recording pole 51, which magnetizes a magnetic recording medium 90; a return pole 52, spaced at a predetermined distance from the recording pole 51; a connection portion 53, which magnetically connects the recording pole 51 and the return pole 52; and an induction coil 54 which induces a magnetic field around the recording pole 51. The heat assisted magnetic recording head 10 may further comprise a reproduction element 55 which records and reproduces data. Reference numbers 56, 57, and 58 denote insulation layers made of non-magnetic materials, and reference number 59 denotes a shield layer which shields a stray field together with the return pole 52.

An end of the near field light generating device 20, an end of the recording pole 51, an end of the return pole 52, and an end of the reproduction element 55 form a part of an air bearing surface 12 of the magnetic recording head 10 facing the magnetic recording medium 90.

The near field light generating device 20 comprises a light source 40 disposed at the substrate 11, a first clad layer 28, a wave guide core 21, and a solid immersion mirror 22, which are adjacent to the light source 40 and which are sequentially layered on the substrate 11, and a second clad layer 29. The near field light generating device 20 is described above with reference to FIGS. 2A, 5A and 6A.

The heat assisted magnetic recording head 10 is spaced at a predetermined distance D from the magnetic recording medium 90 due to an air dynamic pressure generated by a relative movement with respect to the magnetic recording medium 90. The heat assisted magnetic recording head 10 magnetically records data on the magnetic recording medium 90. Reference number B denotes the direction of the relative movement of the magnetic recording medium 90 with respect to the magnetic recording head 10.

The near field light generating device 20 irradiates the near field light L having a beam size less than the diffraction limit onto the magnetic recording medium 90. Then, as the near field light L rapidly vanishes according to the traveled distance, the distance D between the air bearing surface 12 and the magnetic recording medium 90 should be maintained within a range of about a few nm to 100 nm.

The magnetic recording medium 90 typically comprises a base 91, a soft magnetic material layer 92 layered on the base 91, and a recording layer 93 layered on the soft magnetic material layer 92 and made of a hard magnetic material layer.

The near field light L irradiated by the near field light generating device 20 locally heats the recording layer 93 to lower the coersive force thereof. As the magnetic recording medium 90 moves in the direction B, the locally heated region moves to the end of the recording pole 51 and is magnetized by the magnetic flux leakage generated at the end of the recording pole 51. The magnetic flux leakage induced by the induction coil 54 changes the direction of the magnetic field and sequentially changes the magnetization vector of the recording layer to record information. The induced magnetic flux forms a closed loop which originates from the recording pole 51, and passes the soft magnetic material layer 92, the return pole 52, and the connection portion 53.

In the embodiment of FIG. 7, the near field light generating device 20 and the recording unit 50 are sequentially layered on the substrate 11. However, the order of layering of the near field light generating device 20 and the recording unit 50 may be changed. In this case, however, the magnetic recording medium moves so as to be heated by the near field light generating device before data is magnetically recorded by the recording pole. In addition, although the heat assisted magnetic recording head 10 illustrated in FIG. 7 is a perpendicular magnetic recording system, the present invention can be applied to a horizontal magnetic recording system.

When the near field light generating device described above is realized as a flat panel type optical system, the optical parts forming the near field light generating device can be small-sized, lightweight, and thin, and the device can be manufactured by ordinary thin film processes, together with a thin film magnetic recording head.

The near field light generating device and the heat assisted magnetic recording head with the same of the present invention have the following exemplary effects.

First, it is possible to make the optical parts of the near field light generating device small, lightweight and thin, and as the structure of the near field light generating is relatively simple, it is possible to simplify the process of manufacturing the near field light generating device and the heat assisted magnetic recording head with the same.

Second, it is possible to increase the light efficiency of the near field light generating device as there is almost no light loss except for the coupling loss from the light source to the waveguide core.

Third, it is possible to minimized optical aberration (specifically, chromatic aberration) by using a mirror optical system where the refraction surface exists only in the upper transmission surface.

Fourth, it is possible to reduce the number of optical parts because the allowable misalignment degree of the incident beam with respect to the optical axis is large because the solid immersion mirror and the collimator lens is not used.

Fifth, it is possible to reduce the light spot size because the number of apertures can be increased by using materials having large refractive indexes for the body of the solid immersion mirror.

Sixth, it is possible to reduce more the beam size of the near field light and to strengthen the intensity of the near field light by using the bow-tie antenna structure in the lower transmission region.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A near field light generating device comprising:
   a light source;
   a waveguide core which transmits light emitted from the light source; and
   a solid immersion mirror which generates near field light, comprising:
      an upper transmission surface through which light from the waveguide core is transmitted into the solid immersion mirror;
      a lower reflection surface, opposite the upper transmission surface, which reflects light incident thereon;
      lateral reflection surfaces, facing each other at sides of the solid immersion mirror, which reflect light incident thereon; and
      a lower transmission region disposed at a center of the lower reflection surface;
   wherein light reflected from the lateral reflection surfaces forms a light spot on the lower transmission region,
   wherein the waveguide core is a flat panel type;
   wherein the solid immersion mirror is a flat panel type;
   wherein the effective refractive index of the solid immersion mirror is greater than the effective refractive index of the waveguide core; and
   wherein the thickness of the solid immersion mirror is greater than the thickness of the waveguide core.

2. The device of claim 1, wherein the solid immersion mirror is integrally formed with the waveguide core.

3. The device of claim 1, wherein the upper transmission surface is a curved surface having negative refractive power.

4. The device of claim 1, wherein the refractive index of the material forming the solid immersion mirror is greater than the refractive index of the material forming the waveguide core.

5. The device of claim 4, wherein the upper transmission surface is a curved surface having negative refractive power.

6. The device of claim 1, further comprising a metal thin film disposed on each of the lower reflection surface and the lateral reflection surfaces.

7. The device of claim 6, wherein the lower transmission region is a through hole in the metal thin film disposed on the lower reflection surface, and the diameter of the through hole is less than or equal to the wavelength of the light from the light source.

8. The device of claim 7, wherein at least one protrusion of the metal thin film disposed on the lower reflection surface extends into the through hole of the lower transmission region.

9. The device of claim 6, wherein the metal thin film comprises a metal having a high conductivity such that surface plasmon excitation is generated by the light spot formed on the lower transmission region.

10. The device of claim 9, wherein the metal thin film comprises at least one of Au, Ag, Pt, Cu, and Al.

11. The device of claim 1, further comprising a clad layer adjacent to the waveguide core and the solid immersion mirror, wherein the refractive index of the material of the clad layer is less than the refractive index of the material of the waveguide core and the material of the solid immersion mirror.

12. The device of claim 11, further comprising a second clad layer, wherein the waveguide core and the solid immersion mirror are disposed between the clad layer and the second clad layer, and wherein the refractive index of the material of the second clad layer is less than the refractive index of the material of the waveguide core and the material of the solid immersion mirror.

13. The device of claim 1, wherein the light source is a laser diode which abuts the waveguide core.

14. A heat assisted magnetic recording head, comprising:
   a recording pole which generates magnetic flux leakage for magnetic recording on a recording medium; and
   a near field light generating device, adjacent to the recording pole, which irradiates light onto the recording medium prior to the magnetic flux leakage,
   wherein the near field light generating device comprises:
      a light source
      a waveguide core which transmits light emitted form the light source; and a solid immersion mirror which generates near field light, comprising:
- an upper transmission surface through which light from the waveguide core is transmitted into the solid immersion mirror;
- a lower reflection surface, opposite the upper transmission surface, which reflects light incident thereon;
- lateral reflection surfaces, facing each other at sides of the solid immersion mirror, which reflect light incident thereon; and
- a lower transmission region disposed at a center of the lower reflection surface;

wherein light reflected from the lateral reflection surfaces forms a light spot on the lower transmission region, wherein the waveguide core is a flat panel type;

wherein the solid immersion mirror is a flat panel type;

wherein the effective refractive index of the solid immersion mirror is greater than the effective refractive index of the wave guide core; and wherein the thickness of the solid immersion mirror is greater than the thickness of the waveguide core.

15. The recording head of claim 14, wherein the solid immersion mirror is integrally formed with the waveguide core.

16. The recording head of claim 14, wherein the upper transmission surface is a curved surface having negative refractive power.

17. The recording head of claim 14, wherein the refractive index of the material forming the solid immersion mirror is greater than the refractive index of the material forming the waveguide core.

18. The recording head of claim 17, wherein the upper transmission surface is a curved surface having negative refractive power.

19. The recording head of claim 14, further comprising a metal thin film disposed on each of the lower reflection surface and the lateral reflection surfaces.

20. The recording head of claim 19, wherein the lower transmission region is a through hole in the metal thin film disposed on the lower reflection surface, and the diameter of the through hole is less than or equal to the wavelength of the light form the light source.

21. The recording head of claim 20, wherein at least one protrusion of the metal thin film disposed on the lower reflection surface extends into the through hole of the lower transmission region.

22. The recording head of claim 19, wherein the metal thin film comprises a metal having a high conductivity such that surface plasmon excitation is generated by the light spot formed on the lower transmission region.

23. The recording head of claim 22, wherein the metal thin film comprises at least one of Au, Ag, Pt, Cu, and Al.

24. The recording head of claim 14, further comprising a clad layer adjacent to the waveguide core and the solid immersion mirror, wherein the refractive index of the material of the clad layer is less than the refractive index of the material of the waveguide core and the material of the solid immersion mirror.

25. The recording head of claim 24, further comprising a second clad layer, wherein the waveguide core and the solid immersion mirror are disposed between the clad layer and the second clad layer, and wherein the refractive index of the material of the second clad layer is less than the refractive index of the material of the waveguide core and the material of the solid immersion mirror.

26. The recording head of claim 14, wherein the light source is a laser diode which abuts the waveguide core.

* * * * *